United States Patent [19]
Spilde

[11] Patent Number: 4,534,278
[45] Date of Patent: Aug. 13, 1985

[54] LIVESTOCK CONFINEMENT BUILDING WALL-VENT CONTROLLER

[76] Inventor: Rodney L. Spilde, 6300 W. Richmond Rd., Aberdeen, S. Dak. 57401

[21] Appl. No.: 502,691

[22] Filed: Jun. 9, 1983

[51] Int. Cl.³ ............................................... F24F 7/00
[52] U.S. Cl. ........................................ 98/37; 49/340;
49/345; 74/104; 74/105; 74/522
[58] Field of Search ................ 49/340, 345, 346, 344;
74/104, 105, 522; 98/32, 33 R, 37, 39, 42 R, 43 R, 43 A; 236/49

[56] References Cited
U.S. PATENT DOCUMENTS

| 438,099 | 10/1890 | Colton | 49/344 X |
| 3,139,276 | 6/1964 | Hay | 49/346 X |
| 3,913,969 | 10/1975 | Hoch | 49/340 X |
| 4,051,746 | 10/1977 | Liljeros | 49/345 X |
| 4,206,571 | 6/1980 | Kramer et al. | 49/345 X |

FOREIGN PATENT DOCUMENTS 554135 7/1932 Fed. Rep. of Germany ........ 49/340

Primary Examiner—Harold Joyce
Attorney, Agent, or Firm—Malcolm Reid

[57] ABSTRACT

A pneumatic wall-vent closer for use in a thermal-pneumatic automatic temperature control system. The system is used to maintain constant temperature in livestock confinement buildings. The wall-vent closer attaches between the sill of a wall-vent in a confinement building and the wall-vent. As the temperature in the confinement building varies, the pneumatic wall-vent closer automatically opens and closes the wall vents to allow more or less air into the confinement building to maintain a pre-set stable temperature.

3 Claims, 8 Drawing Figures

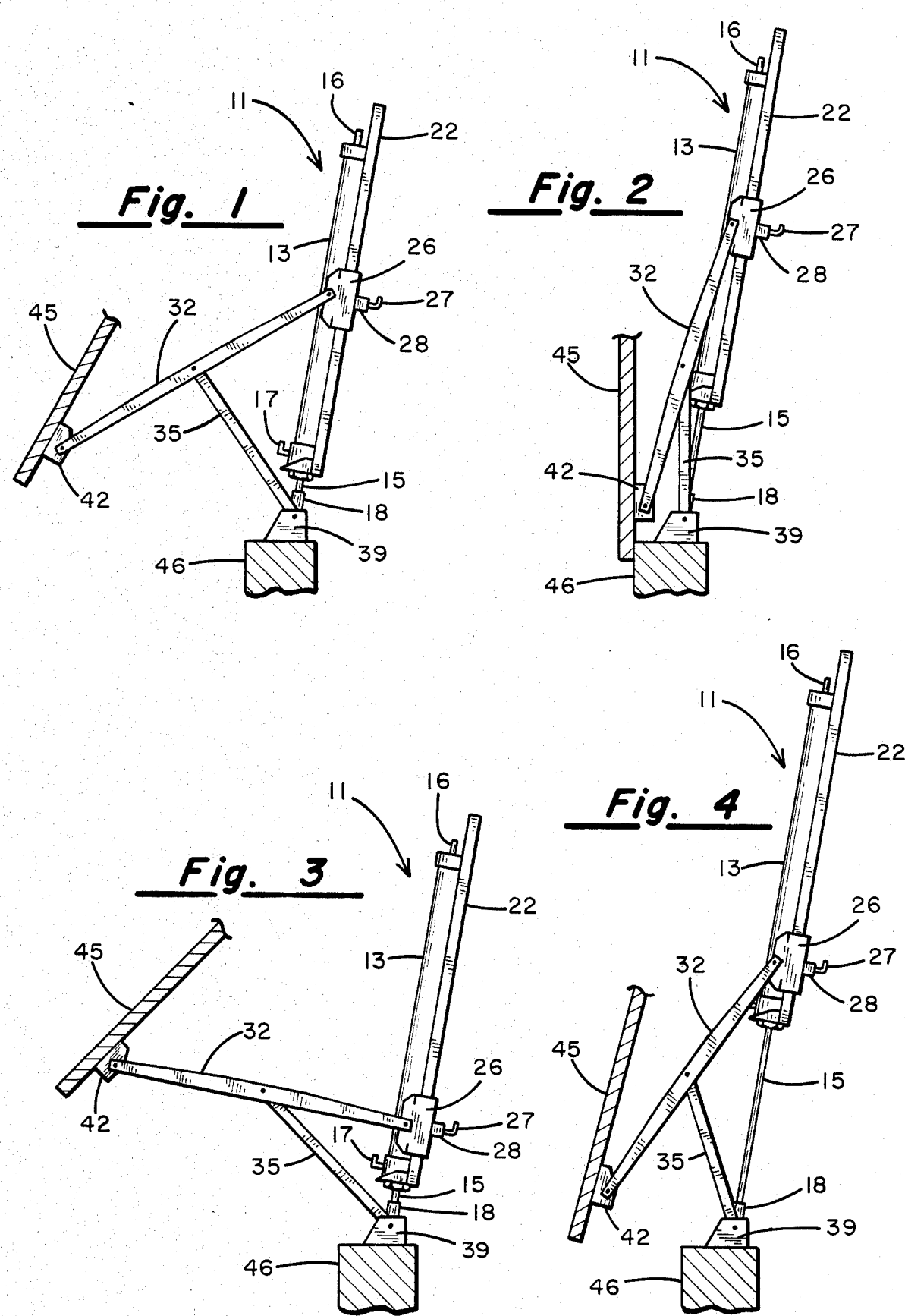

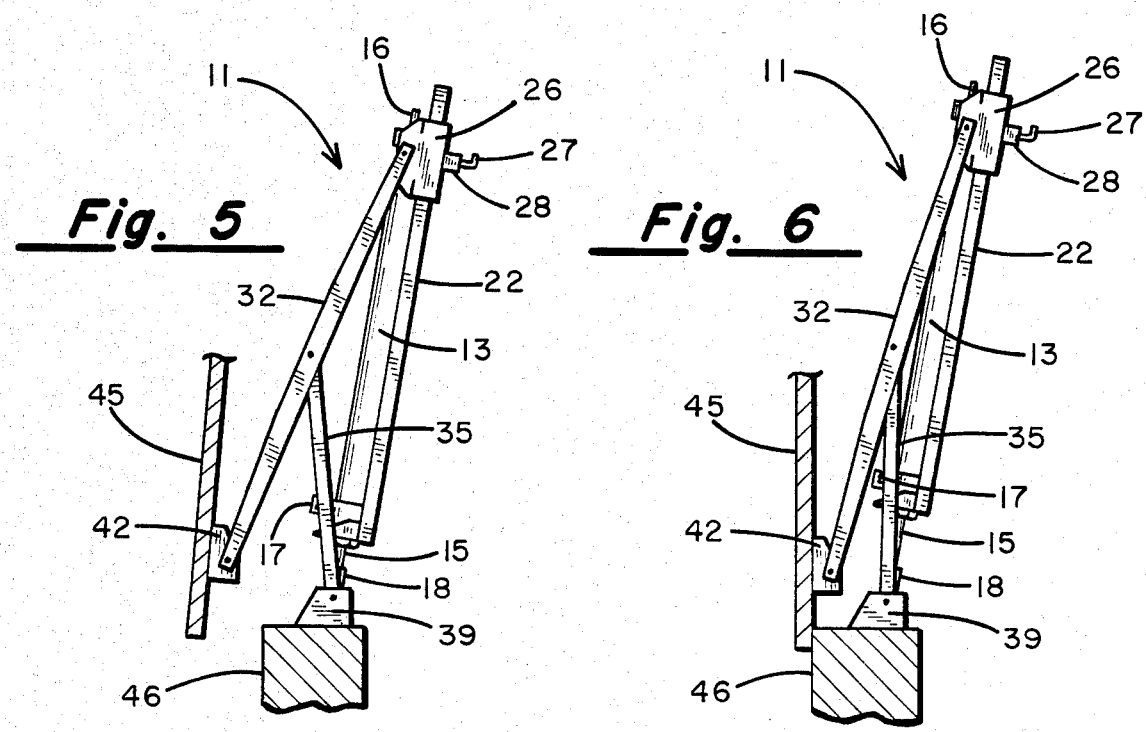

LIVESTOCK CONFINEMENT BUILDING WALL-VENT CONTROLLER

BACKGROUND OF THE INVENTION

1. Field of the Invention

This invention relates generally to a wall-vent controller for use in a livestock confinement building for the purpose of opening and closing wall-vents and thereby maintaining a constant temperature in the confinement building.

2. Description of the Prior Art

Modern practices of agriculture dictate that for maximum yield, livestock such as hogs should be reared in confinement buildings. These confinement buildings generally are unheated since the body heat of the densely packed livestock is usually adequate to maintain the temperature of the confinement building in the coldest months of the year. However, as the outside temperature of the environment increases from the coldest point of the year, it is necessary to open multiple wall-vents in the livestock buildings to allow the outside ambient air to enter the building to maintain the inside temperature at a constant and acceptable level. As the outside ambient temperature continues to increase in the course of the seasons, the wall-vents must be increasingly opened, both as to the frequency and as to the degree of the opening.

It has been the commonly accepted practice for a livestock owner to check the temperature of the building many times during the day. As the temperature in the confinement building decreases below an acceptable level, the livestock owner closes the wall-vents around the periphery of the confinement building to such a degree that the temperature is able to rise to an acceptable level. The livestock owner learns to open and close the wall-vents to just the right amount by experience. As the temperature in the confinement building increases beyond an acceptable level, the livestock owner must open the wall-vents to a greater extent to allow increased ventilation in the building to cause a decrease in the temperature to the acceptable level.

Naturally, the requirement of continually checking the temperature and adjusting the wall-vents by one's judgment based upon past experience is an annoying and time consuming task. It also is not a very accurate way of maintaining a constant temperature. The wall-vent closer of the present invention is designed to operate in conjunction with a thermal-pneumatic temperature control system for use in livestock confinement buildings. With the use of the wall-vent closer of the present invention and a thermal-pneumatic system whereby temperature is continuously sensed and in the event the temperature rises above or below a predetermined set level, a pneumatic system is actuated which pneumatically drives a pneumatic cylinder-piston assembly which is a part of the wall-vent closer of the present invention. The pneumatic cylinder-piston assembly actuates the wall-vent closer of the present invention to either open or close the wall-vents of the confinement building so that the temperature is allowed to rise or fall automatically to maintain the desired temperature level.

SUMMARY OF THE INVENTION

The present invention comprises a pneumatic wall-vent closer for use in a thermal-pneumatic automatic temperature control system. The automatic temperature control system is used to maintain a constant temperature in livestock confinement buildings.

Due to the heat that is generated by the densely packed livestock in a livestock confinement building, there must be adequate ventilation to maintain the temperature. However, the ventilation must vary from season to season, from day to day, and from morning to evening. As in conventional heating and cooling systems, a thermostat is provided which senses the temperature in the confinement building which also has a means for establishing a pre-set temperature to which the confinement building is to be held. As the temperature rises above the pre-set temperature or falls below it, the thermostat triggers a temperature modifying device. In conventional heating/cooling systems the temperature modifying device is either a heater for cold weather or an air conditioning system for warm weather. In the livestock confinement building where neither artificial means of heating or cooling is provided, the temperature modifying device may be multiple wall-vents which must be opened and closed to varying degrees to allow outside air to flow into the building and thereby modify the interior temperature. The multiple wall-vents in conventional confinement buildings are located in the sides of the confinement buildings and generally surround the periphery of the building. The wall-vents usually open to the outside. They may also open to the inside.

The wall-vent closer of the present invention attaches to the still of one of these wall-vents. Another part of the wall-vent closer attaches to the wall-vent. As the temperature rises above a predetermined level, the thermostat turns on a source of compressed air. The compressed air is connected by an air hose to a first air nipple of a pneumatic cylinder and piston assembly which is an integral part of the wall-vent closer to retract the piston into the cylinder and thereby open the wall-vent by extending an arm of the wall-vent closer.

As the temperature in the confinement building falls below a predetermined level a source of compressed air is once again activated, but this time the source of compressed air is connected to a second air nipple on the pneumatic cylinder to thereby extend the piston which results in the arm of the wall-vent closer moving inwardly pulling the wall-vent closed since the end of the arm is attached to the wall-vent.

The method of switching the source of compressed air from one air nipple on the wall-vent closer to the other is done by conventional valving means. The source of compressed air and the valving means, comprises an air compressor, an air tank, air lines, a thermostat for sensing temperature and comparing the sensed temperature to a predetermined level and generating an output which is directly proportional to the difference between the sensed temperature and the predetermined level, and an air valve in line between the pneumatic assembly of the wall-vent closer and the source of compressed air to switch compressed air to the first air nipple on the pneumatic assembly or the second air nipple depending upon whether the wall-vent is to be opened or closed. The air valve is controlled by the output of the thermostat.

The wall-vent closer of the present invention is pneumatically controlled and actuated. The actuating device of the present invention consists of a conventional double acting air cylinder. The air cylinder is capable of extending a piston when compressed air is connected to an air nipple on the end of the cylinder or retracting the same piston when compressed air is connected to an air nipple near the piston end of the cylinder. Hydraulic fluid may be substituted for the compressed air. The hydraulic fluid may be used in a totally hydraulic system or in a compressed air forced hydraulic system.

The pneumatic cylinder-piston combination referred to as the pneumatic assembly is mounted in a frame. The piston is connected to a means for mounting it to the sill at the base of the wall-vent. The sill mount is affixed to the sill. The piston is pivotally mounted to the sill mount. An arm is pivotally mounted to the frame at one end of the arm and connected to a means for mounting the arm to the wall-vent. The arm is pivotally mounted to the wall-vent mount. The wall-vent mount is fixedly mounted to the wall-vent. A fulcrum is attached between the sill mount and the approximate center of the arm. Both ends of the fulcrum are pivotally mounted, the one end to the sill mount and the other end to the approximate center of the arm. When a source of compressed air is connected to the cylinder end of the pneumatic assembly, the piston is extended outwardly which forces the frame and cylinder to move away from the sill mount. Since the frame is moving away from the sill mount, the wall-vent mount is pulled inwardly towards the sill mount by the fulcrum thereby closing the wall-vent. Were it not for the fulcrum, the frame and the arm would simply rotate around their pivot points without any movement of the wall-vent.

When a source of compressed air is connected to the air nipple near the piston end of the pneumatic assembly, the piston is forced to retract into the bore of the cylinder which causes the arm to be extended and the wall-vent to open.

When a source of compressed air is connected to one or the other air nipple, the unconnected air nipple is allowed to be at ambient pressure. Were the unconnected air nipple not allowed to exhaust into the atmosphere, the pneumatic cylinder would lock up and not move.

BRIEF DESCRIPTION OF THE DRAWINGS

Referring to the drawings, wherein like numerals represent like parts throughout the several views:

FIG. 1 is a side view of a preferred embodiment configuration of the wall-vent closer according to the principals of this invention with the adjustable slide latched at the center of the frame with the piston retracted;

FIG. 2 is a side view of the wall-vent closer with the adjustable slide latched at the center of the frame with the piston fully extended;

FIG. 3 is a wall-vent closer of the present invention with the adjustable slide latched at the bottom of the frame with the piston retracted;

FIG. 4 is the wall-vent closer of the present invention with the adjustable slide latched at the bottom of the frame with the piston fully extended;

FIG. 5 is the wall-vent closer of the present invention with the adjustable slide latched at the top of the frame with the piston retracted;

FIG. 6 is the wall-vent closer of the present invention with the adjustable slide latched at the top of the frame with the piston fully extended;

DESCRIPTION OF THE PREFERRED EMBODIMENT

Figure 7:
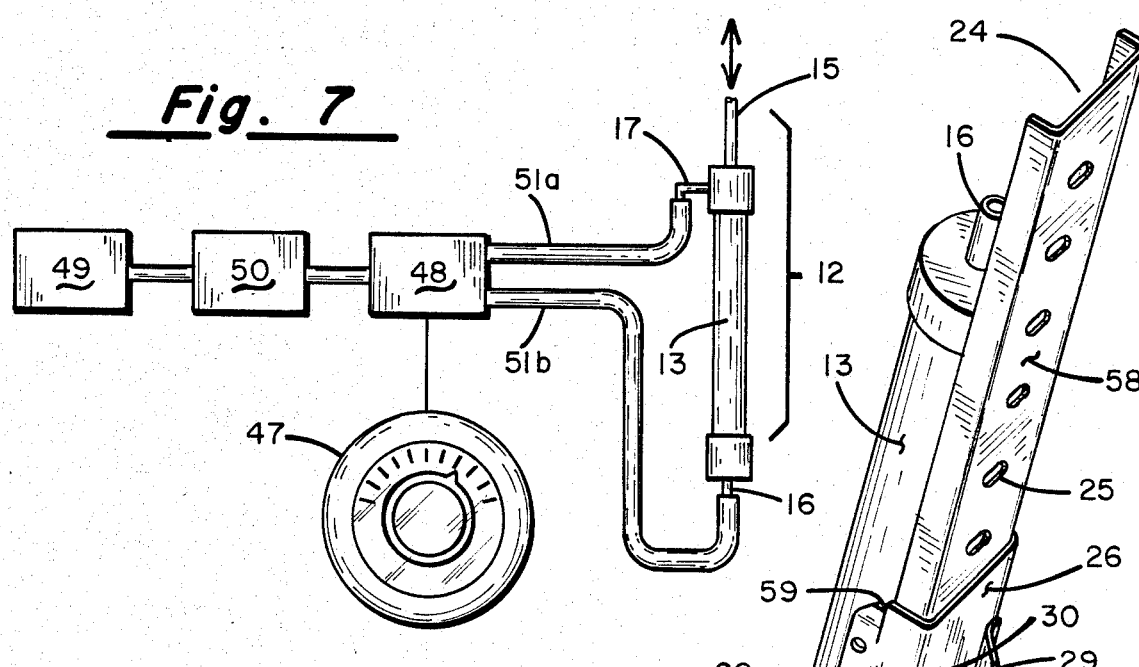
FIG. 7 shows a block diagram of a thermal-pneumatic temperature controlling system in which the wall-vent closer of the present invention is an integral part.
Figure 8:
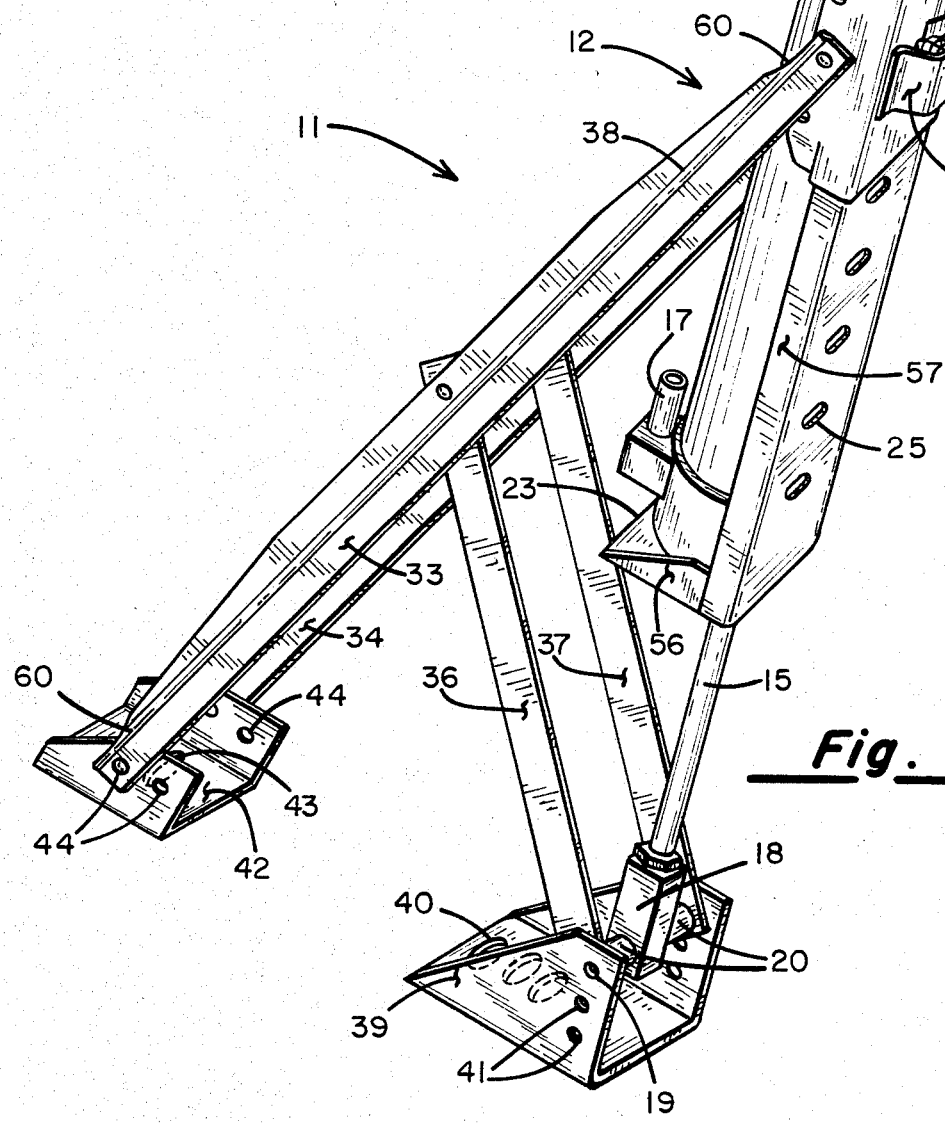
FIG. 8 is a diagrammatic view of a preferred embodiment configuration of the wall-vent closer of the present invention showing the features of the present invention in detail.

Referring to the figures, there is generally illustrated in FIG. 8 a wall-vent closer 11 of the present invention configured for use in combination with a thermal-pneumatic temperature controlling system as shown in FIG. 7.

The active element in the wall-vent closer 11 is a pneumatic assembly 12. The pneumatic assembly 12 is a conventional double acting pneumatic cylinder. The pneumatic assembly 12 has a bore 14 which is not shown down its longitudinal center. The bore 14 houses a piston 15. The piston 15 is extended and retracted in the bore 14 by connecting the pneumatic assembly 12 to a source of compressed air. To extend the piston 15, a source of compressed air is connected to the axial air nipple 16. The radial air nipple 17 is allowed to exhaust into the atmosphere or be connected to ambient air pressure. Internally, the pneumatic assembly 12 has two cup seals which are not shown. One of the cup seals faces the piston 15 end of the pneumatic assembly 12 and the other cup seal faces the cylinder 13 end of the pneumatic assembly 12. When a source of compressed air is connected to the axial air nipple 16, it forces the cup seals which are connected to the piston 15 toward the piston 15 end of the pneumatic assembly 12 which results in extension of the piston 15. The air that is in the cylinder 13 at the forward end of the piston is expelled out the radial air nipple 17. To retract the piston 15 a source of compressed air is connected to the radial air nipple 17 and the axial air nipple 16 is allowed to exhaust into the atmosphere. If the axial air nipple were not allowed to exhaust to the atmosphere when the piston is being retracted, the air remaining between the cup seal and the axial air nipple 16 would be compressed to a certain degree and then would cause the piston 15 to cease moving or create what is called a "locked up" pneumatic assembly 12. Likewise, if the radial air nipple 17 were not allowed to exhaust into the atmosphere when the axial air nipple 16 was connected to a source of compressed air, the pneumatic assembly 12 would also lock up.

The pneumatic assembly 12 is mounted in a frame 22. The frame 22 is comprised of a cylinder mount member 23 and a slotted member 24. The cylinder mount member 23 is manufactured out of stainless steel sheet stock. The cylinder mount member has an aperture 54 stamped in its end. A threaded shank on the piston 15 end of the pneumatic assembly 12 is inserted through the piston aperture 54. A nut is threaded onto the threaded shank of the pneumatic assembly 12 to tightly affix the pneumatic assembly 12 to the cylinder mount member 23. The cylinder mount member 23 of the preferred embodiment has three side walls 56. These side walls are spot-welded to the channel sides 57 which run the entire length of the slotted member 24. The slotted member 24 forms a stainless steel channel which runs the length of the pneumatic assembly 12. A series of spaced slots 25 or holes are stamped into the backside 58 of slotted member 24 along the longitudinal center line of the backside 58. The slotted member 24 is affixed to cylinder mount member 23 at right angles.

Slidably mounted on the slotted member 24 is an adjustable slide 26. The adjustable slide 26 surrounds the backside 58 of the slotted member 24 and the channel sides 57. The adjustable slide 26 extends outwardly beyond the channel sides 57 of the slotted member 24 just beyond the free edges of the channel sides 57. The sidewalls of the adjustable slide 26 are bent inwardly at both ends of the sidewalls of the adjustable slide 26 to form retention tabs 59. The four retention tabs 59—two retention tabs on either side of the adjustable slide 26—allow the adjustable slide 26 to move longitudinally in respect to the slotted frame member 24, but arrest the transverse movement.

Welded to the backside of the adjustable slide 26 is a pin guide 28. The pin guide 28 extends transversely across the adjustable slide 26 and is raised above the backside of the adjustable slide 26 at the center point of the adjustable slide 26. The pin guide 28 has an aperture 31 in its center. In axial alignment with the pin guide aperture 31 is a second aperture 55 in the adjustable slide 26. The pin guide aperture 31 and the adjustable slide aperture 55 are in transverse alignment with the slots 25 in the slotted mount member 24. A latch pin 27 is inserted through the pin guide aperture 31 and the adjustable slide aperture 55 and a slot 25. A biasing element such as a spring 29 is placed between the pin guide 28 and the adjustable slide aperture 55 so that it surrounds the latching pin 27. A spring stop 30 is a pin which is inserted through a hole drilled in the latch pin 27 transverse to the latch pin 27 diameter and at a point on the latch pin 27 adjacent the aperture in the adjustable slide 55. This spring stop 30 causes the spring 29 to assert a downward force on the latch pin 27 maintaining the latch pin in a desired slot 25.

Pivotally mounted on the adjustable slide 26 and extending in a direction away from the back of the slotted member towards the cylinder 13 is an arm 32. The arm 32 is comprised of an arm first side 33 and an arm second side 34. The arm first side 33 and the arm second side 34 extend to a wall-vent mount 42. The wall-vent mount 42 is constructed of stainless steel sheet metal as are virtually all of the parts of the wall-vent closer 11 with the obvious exception that the pneumatic assembly 12 is constructed of stainless steel, but not sheet metal. The wall-vent mount 42 is pivotally mounted to the respective arm sides 33 and 34. The wall-vent mount 42 consists of two sides for pivotal mounting to the arm sides 33 and 34 and a wall-vent mounting member extending between the two sides. The wall-vent mounting member has an aperture in it for receiving a bolt or wood screw to mount the wall-vent mount 42 to a wall-vent 45.

The arm sides 33 and 34 each have an offset rib 38 for strengthening purposes. At the end of each offset rib 38 is a gusset 60. The gusset 60 is simply an outward bend of the offset rib 38 to further add strength to the arm 33 and 34. Both arm sides 33 and 34 are identical stampings. To form one arm side 33 or 34 rather than another arm side 33 or 34, the stamped arm side 33 or 34 need simply be reversed like a mirror image. Having one part instead of two saves assembly time and the cost of inventorying additional parts. It also results in a saving in the tooling necessary to manufacture the parts.

The free end of the piston 15 is pivotally connected to a sill mount 39. The sill mount 39 is similar in design to the wall-vent mount 42 in that it has two sides which are perpendicular to a mounting plate. The mounting plate of the sill mount 39 has several slots or holes in it for receiving a nut and bolt combination or a wood screw. It has been found that the slots are preferable to a round hole so that the sill mount 39 can be adjusted to the sill 46 before being tightened down. At the end of the piston 15 a clevis 18 is threadably attached. A clevis shaft 19 is passed through mounting holes in the sides of the sill mount 39 and through similar holes in the free end of the clevis 18. A nylon bushing 21 covers the clevis shaft 19 between the sides of the sill mount 39. The nylon bushing 21 is intended to allow the clevis 18 to pivot on the clevis shaft 19 freely. Nylon bushings of a greater diameter than the previously mentioned nylon bushing 21 are placed over the bushing 21 to act as spacers 20 between the clevis 18 and the sides of the sill mount 39. This arrests any transverse movement of the clevis 18 with relation to the sill mount 39.

Also pivotally mounted on the clevis shaft 19 is a fulcrum 35. The fulcrum 35 consists of a fulcrum first side 36 and a second side 37 each of which is identical to the other and which is simply a flat rectangular piece of stainless steel sheet. The two fulcrum sides 36 and 37 extend from the clevis shaft 19 to a point which is approximately at the center of the arm 32 where they are pivotally mounted to the respective sides 33 and 34 of the arm 32.

The aperture in the sill mount 41 through which the clevis shaft 19 extends, exists in multiple sets so that the sill mount 39 can be field adjusted with relation to the clevis shaft 19. Likewise, there are multiple sets of aperture in the arm 32 for mounting of the fulcrum 35 for field adjustment. The adjustable slide 26 also has multiple sets of aperture for pivotally mounting the arm 32 for field adjustment. These multiple aperture allow the wall-vent closer 11 to be very versatile in that the wall-vent closer can be field modified to be mounted with various configurations of wall-vents.

OPERATION OF THE PREFERRED EMBODIMENT

FIG. 7 shows a block diagram of a livestock confinement building temperature control system wherein the present invention is an integral part. A thermostat 47 senses the temperature of the livestock confinement building. The thermostat 47 in a similar fashion to coventional has a provision to set the thermostat 47 to a desired preset temperature level. The thermostat 47 completes an electrical circuit when there is a difference between the preset temperature and the actual temperature level. If the actual temperature exceeds the preset level, the thermostat 47 actuates air line 51a which is connected to a source of compressed air. The source of compressed air is then connected to the radial air nipple 17 and the piston 15 is retracted thereby opening wall-vent 45. In the event the thermostat 47 senses that the actual temperature is below the preset level, the thermostat 47 actuates air line 51b and a source of compressed air is connected to axial air nipple 16 resulting in the extension of the piston 15 and the closing of the wall-vent 45.

The method of switching the source of compressed air from one air nipple on the wall-vent closer 11 to the other is done by conventional valving means. The source of compressed air and the valving means, comprises an air compressor 49, an air tank 50, air lines 51a and 51b, the thermostat 47 for sensing temperature and comparing the sensed temperature to a predetermined level and generating an output which is directly proportional to the difference between the sensed temperature and the predetermined level, and an air valve 48 in line between the pneumatic assembly 12 of the wall-vent closer 11 and the air tank 50 to switch compressed air to the first air nipple on the pneumatic assembly or the second air nipple depending upon whether the wall-vent 45 is to be opened or closed. The air valve 48 is controlled by the output of the thermostat 47. The compressor 49, the air tank 50, the air valve 48, the thermostat 47, and the air line 51a and 51b are all commercially available components. When the air valve 48 switches the source of compressed air from one air nipple to the other air nipple, the air nipple which is not connected to the source of compressed air is allowed to exhaust into the atmosphere.

In a livestock confinement building which is temperature controlled by adjustment of wall-vents 45, there are generally a large number of wall-vents 45. The wall-vent closer 11 of the present invention is designed to open single wall-vents 45 or to be tied in tandem so that it can open multiple wall-vents 45. The method of connecting the multiple wall-vents 45 in tandem is not shown in the drawing but is of a conventional nature. The door closer 11 can be used with center-pivot wall-vents 45, top-hinged wall-vents 45 or bottom-hinged wall-vents 45. FIGS. 1 through 6 show the wall-vent closer 11 used with a top-hinged wall-vent with the wall-vent mount 42 attached to the wall-vent 45 at the bottom of the wall-vent 45. The wall-vent mount 42 could just as well have been attached to the center of the wall-vent 45 or at the top of the wall-vent 45 depending upon the size and shape of the wall-vent 45. The attachment point of the wall-vent mount 42 and the sill mount 39 can be determined in the field. The wall-vents 45 are generally automated to open to approximately 45 degrees to provide the most efficient air flow. The maximum opening of the wall-vent 45 is determined by the placement of the adjustable slide 26 in relation to the slotted member 24. FIG. 1 illustrates the adjustable slide 26 latched at the center of the slotted member 24. Latched in this position, the wall-vent 45 can open through an approximate range of 0 degrees at the closed position to 30 degrees at the maximum opened position. FIG. 2 likewise, shows the adjustable slide 26 latched at the center, but shows the wall-vent 45 in the closed position. FIG. 3 shows the adjustable slide 26 latched at the bottom of the slotted member 24 with the wall-vent 45 at the maximum open position which is approximately 45 degrees. With the adjustable slide 26 latched to the bottom of the slotted member 24, the range of wall-vent 45 movement is from approximately 15 degrees to approximately 45 degrees. This would be a summer setting which would result in the wall-vents 45 never being capable of completely closing. FIG. 4 also shows the adjustable slide 26 latched at the bottom of the slotted member 24, but with the wall-vent 45 at the point of maximum closure which is approximately 15 degrees.

FIG. 5 shows the adjustable slide 26 latched at the top of the slotted member 24. Latched at this point, the range of wall-vent 45 travel is from fully closed to approximately 5 degrees open. FIG. 5 shows the wall-vent 45 at the point of maximum opening. FIG. 6 shows the adjustable slide 26 latched at the top as shown in FIG. 5, but with the wall-vent 45 fully closed.

The range of opening shown in FIGS. 1 through 6 is approximate. The actual range of opening will be affected by the size of the wall-vent and the point where the wall-vent closer 11 is mounted to the wall-vent.

The adjustment setting shown in FIG. 5 would be that which would be used in the dead of winter when only the minimum of opening could be tolerated. As the season changed from the dead of winter to the hottest part of summer the adjustable slide 26 would be gradually moved down on the slotted member 24 until it reached the bottom of the slotted member 24 during the hottest part of the summer. During the hottest part of the summer the wall-vents 45 are to never be fully closed and when in the fully open position they are to be opened to the optimally maximum degree which for shading purposes and for air ventilation purposes has been determined to be approximately 45 degrees.

Assuming the proper seasonal adjustment is made to the adjustable slide 26, as the thermostat 47 senses that the temperature in the livestock confinement building is rising above the preset level, the air valve 48 is triggered so that the piston 15 is fully retracted thereby opening the wall-vents 45 to the maximum degree allowed for that seasonal adjustment. As the temperature in the livestock buidling begins to fall as a result of the increased airflow in the building, the wall-vents 45 are kept fully opened until the temperature falls below the preset level at which point the air valve 48 is switched so that the axial air nipple 16 is connected to the source of compressed air and the piston 15 is fully extended, thereby closing the wall-vents 45 to the maximum point of closure allowed by the seasonal adjustment of the adjustable slide 26. At the point where the temperature again rises above the predetermined level, the cycle is repeated, thereby maintaining the entire livestock confinement building at a stable predetermined level of temperature.

The wall-vent closure 11 is usuable with any compressor 49 that cycles on at eighty pounds per square inch and cycles off at one hundred pounds per square inch. The compressor 49 should preferably be housed outside the raising area. If the compressor 49 is housed inside the raising area, a fresh air intake must be provided to ensure a fresh air supply to the air tank 50, air valve 48, and the pneumatic assembly 12, since contaminated air will reduce the life of the system.

With wall-vent closer 11 mounted to the sill 46 by the sill mount 39, and to the wall-vent 45 by the wall-vent mount 42, the wall-vent closer 11 will project substantially upward and not outwardly into the area of the confinement building creating a collision hazard for people and movable objects within the confinement building. The wall-vent closer 11 could also be reversed in that the wall-vent mount 42 could be mounted to the sill 46 and the sill mount 39 could be mounted to the wall-vent 45. The wall-vent closer 11 could be operable in this orientation, but the wall-vent closer 11 would project into the interior of the confinement building to such a degree that walking near the walls of the confinement building would be hazardous.

The preferred embodiment of the wall-vent closer 11 requires a minimum air tank 50 capacity of one gallon per wall-vent closer 11.

I have disclosed a preferred embodiment description and application of the invention. Other modifications of the invention which are not specifically disclosed or referred to will be apparent to those skilled in the art in light of the foregoing description. This description is intended to provide a concrete example of the preferred embodiment structure and application, clearly disclosing the present invention and its operative principals. Accordingly, the invention is not limited to any particular embodiment or configuration of component parts thereof. All alternatives, modifications and variations of the present invention which fall within the spirit and broad scope of the appended claims are covered.

What is claimed is:

1. A wall-vent closer comprising:
   (a) a pneumatic assembly having a means for extending a piston out of a cylinder upon connection of the pneumatic assembly to a first source of compressed air and a means for retraction of the piston into the cylinder upon connection of the pneumatic assembly to a second source of compressed air;
   (b) a frame wherein the pneumatic assembly is mounted, the frame having a cylinder mount member and a slotted member, the cylinder mount member having an aperture through which the piston of the pneumatic assembly extends, the pneumatic assembly being fixedly mounted to the cylinder mount member and the slotted member being affixed to the cylinder mount member and extending parallel with the cylinder, the slotted member having a plurality of spaced slots along its longitudinal center line;
   (c) a means for pivotally connecting the free end of the piston to a first object;
   (d) an arm pivotally affixed to an adjustable slide, the adjustable slide being slidably affixed to the slotted frame member and having a latching means to arrest the slidable movement along the slotted frame member at any one of a plurality of slots along the longitudinal center line of the slotted frame member, the other end of the arm being pivotally affixed to a second object; and
   (e) a fulcrum extending between the first object and a point on the arm between the ends of the arm, both ends of the fulcrum being pivotally mounted so that when the piston moves relative to the cylinder the first and second objects move relative to one another.

2. The wall-vent closer of claim 1, wherein the latching means is comprised of:
   (a) a latch pin;
   (b) a pin guide mounted to the adjustable slide, the center of the pin guide being in line with the slots in the slotted frame member, the pin guide extending away from the adjustable slide;
   (c) an aperture in the adjustable slide in co-axial alignment with a slot in the slotted member and an aperture in the pin guide; and
   (d) a biasing element normally biasing the latch pin through the pin guide aperture, the adjustable slide aperture, and a slot in a slotted member.

3. A wall-vent closer comprising:
   (a) a pneumatic assembly having a means for extending a piston upon connection of the pneumatic assembly to a source of compressed air and a means for retraction of the same piston upon connection of the pneumatic assembly to another source of compressed air;
   (b) a frame having a cylinder mount member and a slotted member, the cylinder mount member having an aperture through which the piston of the pneumatic assembly extends, the cylinder being fixedly mounted to the cylinder mount member, and the slotted member being affixed to the cylinder mount member and extending parallel with the cylinder, the slotted member having a plurality of spaced slots along its longitudinal center line;
   (c) a sill mount pivotally mounted on the free end of the piston so that upon attachment of the sill mount to a sill the frame and pneumatic assembly travels away from or towards the sill mount when a first and second source of compressed air are alternatively connected to the pneumatic assembly;
   (d) an arm having one end pivotally mounted on an adjustable slide, the slide being slidably mounted on the slotted frame member;
   (e) a latching means to arrest the slidable movement of the adjustable slide along the slotted frame member at a slot along the longitudinal centerline of the slotted frame member;
   (f) a wall-vent mount pivotally mounted on the other end of the arm; and
   (g) a fulcrum extending between the sill mount and a point between the ends of the arm, both ends of the fulcrum being pivotally mounted; so that when a first source of compressed air is connected to the pneumatic assembly, a wall-vent which is connected to the wall-vent mount will open and when a second source of compressed air is connected to the pneumatic assembly the wall-vent will close within a predetermined range of travel as determined by the point at which the adjustable slide is latched into the slotted frame member.

* * * * *